(12) United States Patent
Pu et al.

(10) Patent No.: US 9,769,687 B2
(45) Date of Patent: Sep. 19, 2017

(54) METHOD AND RELATED MOBILE DEVICE FOR DETERMINING A REFERENCE SIGNAL RECEIVED POWER

(71) Applicant: Intel IP Corporation, Santa Clara, CA (US)

(72) Inventors: Tian Yan Pu, Dresden (DE); Honglei Miao, Nuremberg (DE)

(73) Assignee: Intel IP Corporation, Santa Clara, CA (US)

(*) Notice: Subject to any disclaimer, the term of this patent is extended or adjusted under 35 U.S.C. 154(b) by 54 days.

(21) Appl. No.: 14/661,552

(22) Filed: Mar. 18, 2015

(65) Prior Publication Data

US 2015/0281988 A1  Oct. 1, 2015

(30) Foreign Application Priority Data

Mar. 28, 2014 (DE) .................. 10 2014 104 460

(51) Int. Cl.
  *H04W 28/04* (2009.01)
  *H04W 24/08* (2009.01)
  *H04L 5/00* (2006.01)
  *H04L 25/02* (2006.01)

(52) U.S. Cl.
  CPC .......... *H04W 24/08* (2013.01); *H04L 5/0007* (2013.01); *H04L 5/0048* (2013.01); *H04L 25/0222* (2013.01); *H04L 25/0242* (2013.01)

(58) Field of Classification Search
  CPC ... H04L 25/0222; H04L 25/0204; H04L 1/20; H04L 25/021; H04L 5/0057; H04L 27/26; H04L 25/02; H04L 25/024; H04B 1/7115; H04B 1/712; H04B 1/1027; H04W 24/08; H04W 52/04
  USPC ..... 370/252, 320, 310.2, 328, 338; 375/224, 375/259, 267, 316
  See application file for complete search history.

(56) References Cited

U.S. PATENT DOCUMENTS

| | | | | |
|---|---|---|---|---|
| 5,671,221 | A  * | 9/1997 | Yang .................... | H04B 1/7115 370/320 |
| 9,072,022 | B1 * | 6/2015 | Shah .................... | H04W 36/30 |
| 2008/0233965 | A1 * | 9/2008 | Kent .................... | H04W 24/10 455/450 |
| 2012/0038521 | A1 * | 2/2012 | Zhu .................... | H04B 17/318 343/703 |
| 2012/0099632 | A1 * | 4/2012 | Bury .................... | H04J 11/0079 375/224 |
| 2013/0034191 | A1 * | 2/2013 | Sakai .................. | H04B 17/318 375/316 |
| 2014/0078912 | A1 * | 3/2014 | Park ..................... | H04L 5/0048 370/252 |
| 2014/0146904 | A1 * | 5/2014 | Onodera ............. | H04B 7/0417 375/267 |

* cited by examiner

*Primary Examiner* — Mohamed Kamara
(74) *Attorney, Agent, or Firm* — Schiff Hardin LLP

(57) ABSTRACT

The present disclosure relates to a method and related mobile device for estimating a channel by choosing a subset of correlated channel coefficients and estimating the reference signal received power of the subset of correlated channel coefficients based on a cross-correlation between channel coefficients of the subset of correlated channel coefficients.

14 Claims, 5 Drawing Sheets

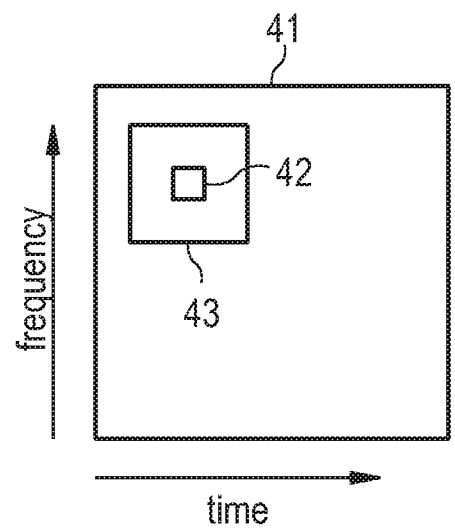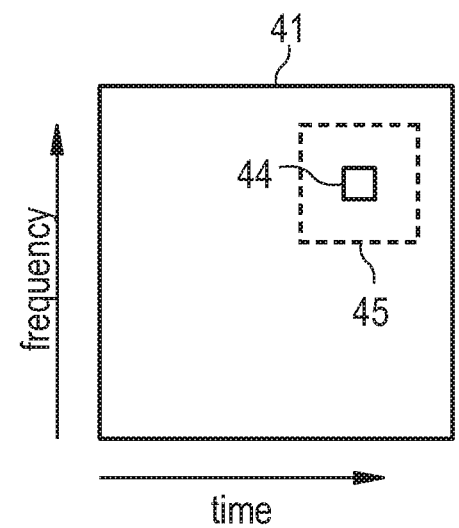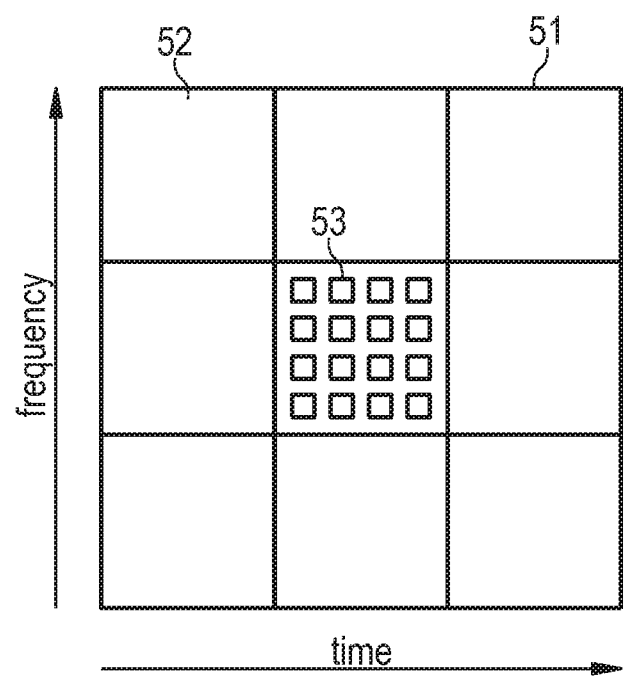

METHOD AND RELATED MOBILE DEVICE FOR DETERMINING A REFERENCE SIGNAL RECEIVED POWER

FIELD OF THE INVENTION

The present disclosure relates to a method and related mobile device for determining a reference signal received power. The present disclosure specifically relates to a method and related mobile device for determining a reference signal received power in an orthogonal frequency division multiplexing mobile communication system.

BACKGROUND OF THE INVENTION

Typically a mobile device in mobile communications network needs to detect a number of surrounding cells. The reference signal receive power (RSRP) and reference signal receive quality (RSRQ) of each detected cell are two key measurement metrics used during the initial cell selection procedure. After camping on a cell, the mobile device reports the RSRP and RSRQ repeatedly to the network to facilitate the mobility management, e.g., network controlled handover. Moreover, the RSRP of a neighboring cell reflects the perceived interference level from the respective neighboring cell, as such, it may be useful for the mobile device to determine whether to adopt further advanced signal processing algorithms or as to cancel/mitigate the interference and improve the link reliability.

It is obvious that the measurement accuracy of RSRP/RSRQ depends on the amount of reference signals present in the time-frequency plane, for example in an OFDM system such as LTE the amount of cell specific reference signals (CRS) employed during the measurement, i.e. measurement bandwidth and number of sub-frames. To achieve an optimized design in terms of performance and power/are a consumption trade-off, the mobile device aims to estimate the RSRP with sufficient accuracy while using as less time-frequency resources as possible, for example in an LTE system as less physical resource blocks (PRB) and sub-frames as possible. Furthermore, it is desired to employ only 6 central PRBs within the system band width in a sub-frame to perform the RSRP measurement and fulfill the relevant performance accuracy.

To facilitate further explanations, the following notation shall be used in this disclosure.

K: Number of CRS resources in the employed measurement time-frequency resources grid.

$h_k$: channel frequency response at the k-th CRS resource, where k=0, . . . , K−1

$\hat{h}_k$: channel frequency response estimate at the k-th CRS resource, where k=0, . . . , K−1

$z_k$: channel frequency response estimate error, and assumed to be independent and identically distributed random variable with complex Gaussian distribution of with zero mean and variance $\sigma_N^2$.

It follows that $$\hat{h}_k = h_k + z_k \tag{1}$$

Defining vectors $\hat{h}=(\hat{h}_0, \hat{h}_1, \ldots, \hat{h}_{k-1})^T$, $h=(h_0, h_1, \ldots, h_{k-1})^T$ and $z=(z_0, z_1, \ldots, z_{k-1})^T$, equation (1) can be simplified as $$\hat{h} = h + z \tag{2}$$

In a current solution, the mobile device firstly calculates the power of channel estimate from each time-frequency resource of the reference signal within the measurement time-frequency resources grid, and then averages over all these power estimates to obtain the RSRP. Hence, typically RSRP estimation is performed by auto-correlating channel coefficients of an estimated channel. This method can be expressed as follows.

$$RSRP = \|\hat{h}\|^2 / K \tag{3}$$

As the estimate involves multiplying a channel coefficient by its complex conjugate, it can be observed that an estimate of the reference signal received power at a specific time-frequency resource is severely corrupted when significant noise is present at this time-frequency resource.

Hence, what is needed is a solution leading to a more accurate estimate of the reference signal received power.

DISCLOSURE OF THE INVENTION

This solution is achieved with a method according to the independent method claim and a related mobile device according to the independent apparatus claim. The dependent claims relate to further aspects of the present solution.

BRIEF DESCRIPTION OF THE DRAWINGS

The method and related mobile device according to the invention are described in more detail herein below by way of exemplary embodiments and with reference to the attached drawings, in which:

FIG. 4 shows the division of a time-frequency grid by sliding a coherence plane along;

FIG. 5 shows the division of a time-frequency grid into non-overlapping coherence planes;

DETAILED DESCRIPTION OF THE INVENTION

Figure 1:
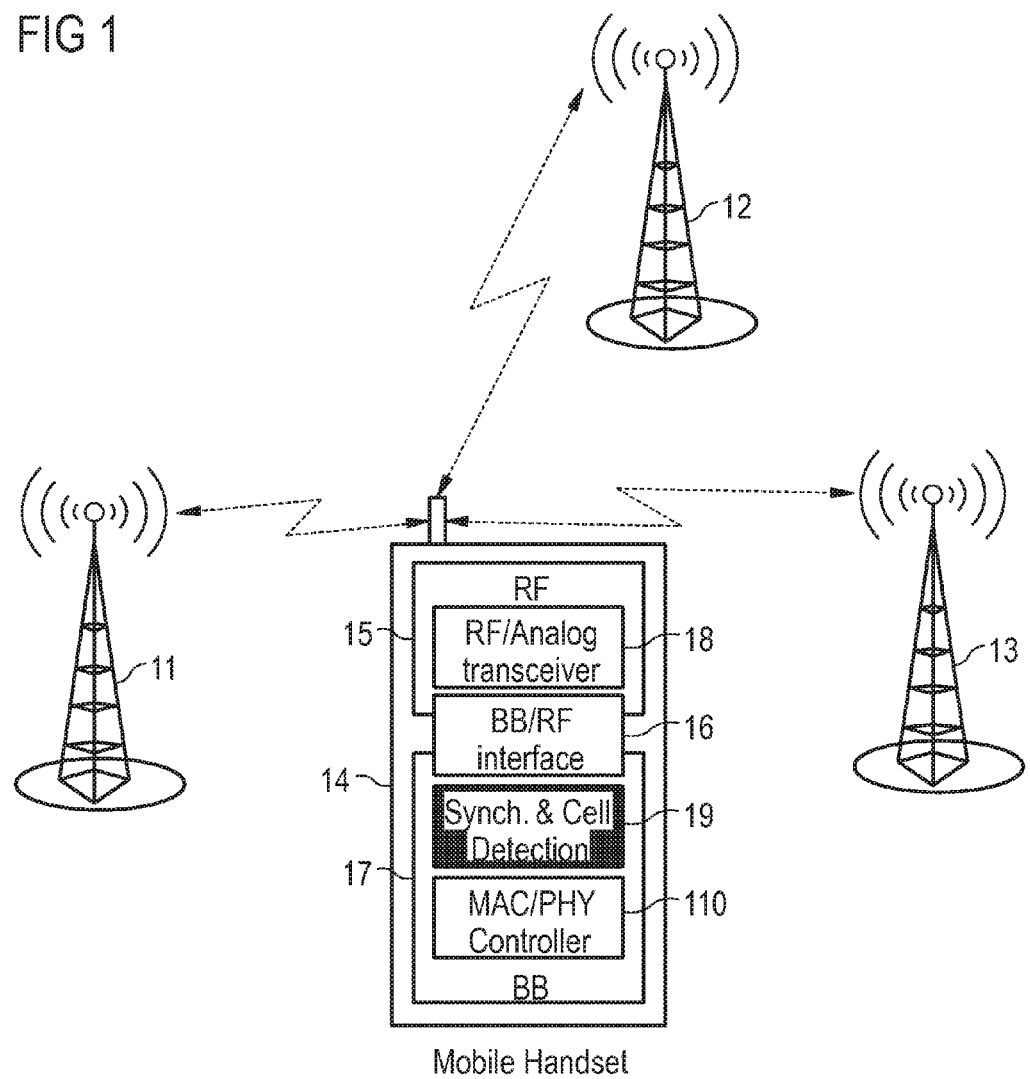
FIG. 1 shows a block diagram of a mobile in a mobile communication system.

FIG. 1 shows a mobile communication system comprising three base stations 11, 12, 13 and a mobile device 14. When powering up the mobile device 14 has no knowledge about the deployment of the base stations 11, 12, 13, hence the number of cells surrounding the mobile device 14. If the mobile device 14 wishes to attach to a cell the mobile device 14 performs an initial cell selection procedure. The initial cell selection procedure requires to measure the reference signal received power (RSRP) as a key measurement metric. Estimating the reference signal received power is part of the baseband processing performed in the baseband processing module 17, specifically in the synchronization and cell detection module 19. The mobile device further comprises a radio frequency module 15 including a radio frequency/analog transceiver 18 for acquiring radio samples. Radio samples are transferred from the radio frequency (RF) module 15 to the base band (BB) processing module 17 via BB/RF interface 16. The Mac/Phy controller 110 may request the synchronization and cell detection module 19 to repeatedly estimate the RSRP and RSRQ once the mobile device camps on a cell so that the mobile device 14 can report the RSRP and RSRQ repeatedly to the network to facilitate mobility management.

The present disclosure relates to a method for determining a reference signal received power based on cross-correlating channel coefficients of a channel that are correlated to an degree where the reference signal received power can be assumed to be constant. The synchronization cell detection module 19 as shown in FIG. 1 typically performs this method. However, this is just an example. Generally, the method is part of baseband processing that may be performed on a digital signal processor or dedicated hardware.

The method comprises estimating a plurality of channel coefficients of a channel for time-frequency resources of a time frequency grid employed by the reference signal; choosing a subset of correlated channel coefficients from the plurality of channel coefficients; and estimating the reference signal received power of the subset of correlated channel coefficients based on a cross-correlation between channel coefficients of the subset of correlated channel coefficients.

The subset of correlated channel coefficients may be chosen from the plurality of channel coefficients based on a coherence time of the channel or coherence bandwidth of the channel. This implies that the reference signal received power can be assumed to be constant for time-frequency resources of the reference signal falling into the coherence time or coherence bandwidth.

For example, a subset may be chosen such that it comprises two adjacent channel coefficients, i.e. time-frequency resources of the reference signal. This would imply the assumption that the channel coherence bandwidth or coherence time is greater than the adjacent time-frequency resource distance of the reference signal in frequency or time direction, respectively. This assumption is generally held for normal channel scenarios.

The mobile device may then perform the method by dividing the channel frequency response estimates into two parts as follows:

The plurality of channel coefficients is divided into channel coefficients having an even index $$\hat{h}_E = (\hat{h}_0, \hat{h}_2, \ldots, \hat{h}_{k-2})^T \quad (4)$$

and channel coefficients having and odd index $$\hat{h}_O = (\hat{h}_1, \hat{h}_3, \ldots, \hat{h}_{k-1})^T \quad (5)$$

wherein subscript E denotes even indexed coefficients and subscript O denotes odd indexed coefficients.

The reference signal received power can be readily estimated as $$\text{RSRP} = 2\hat{h}_E^H \hat{h}_O / K \quad (6)$$

Hence, the RSRP of a subset comprising two adjacent channel coefficients may be estimated by multiplying a Hermitian of a first channel coefficient with even index by a second channel coefficient with odd index. The overall RSRP is then estimated by averaging over the plurality of subsets.

Figure 2:
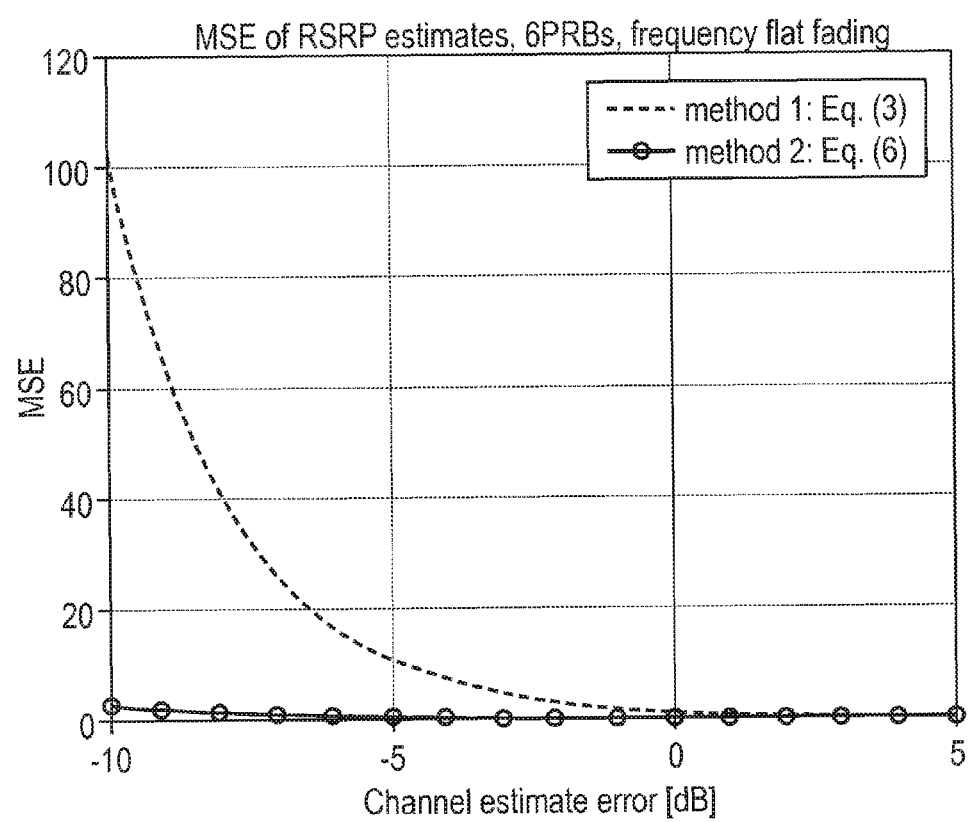
FIG. 2 shows a diagram of the mean squared error (MSE) versus channel estimate errors for (1) method according to Eq. (3) and (2) method according to Eq. (6)

FIG. 2 shows the means squared error (MSE) versus channel estimate errors for (1) method according to Eq. (3) and (2) method according to Eq. (6). It can be observed that the RSRP measurement based on cross-correlation according to the present disclosure as stated in Eq. 6 significantly outperforms the method according to Eq. (3) in terms of mean squared error (MSE) of the RSRP estimate due to the assumption that the channel estimate errors are independent and identically distributed random variables.

It may be that the coherence time or coherence frequency comprises more than two adjacent time-frequency resources of the reference signals. Then, the method can be further enhanced by taking into account the amount of time-frequency resources of the reference signal falling into the channel coherence bandwidth and time. As a result, a very good RSRP measurement accuracy can even be achieved by utilizing a small amount of time-frequency resources of the reference signal, e.g. in an LTE system the central six PRBs in one sub-frame. This significantly reduces the area/memory consumption of the cell detection entity in the mobile device. However, this implies the necessity to estimate the coherence time and coherence of the channel. The coherence time can be estimated from Doppler spread. The coherence bandwidth can be estimated from delay spread.

The channel coherence bandwidth and coherence time are taken into account to form a coherence RSRP plane consisting of a number of time-frequency resources of the reference signal over which the RSRP is assumed to be constant. A subset of the plurality of channel coefficients can be chosen according to the coherence plane. The subset comprises channel coefficients falling into the coherence plane. The mobile device then calculates cross correlation values between all or some of the channel coefficient estimates at time frequency resources of the reference signal in the chosen subset, hence coherence plane. Depending on the performance-complexity tradeoff, the mobile device determines the average cross correlation value in the RSRP subset.

Figure 3:
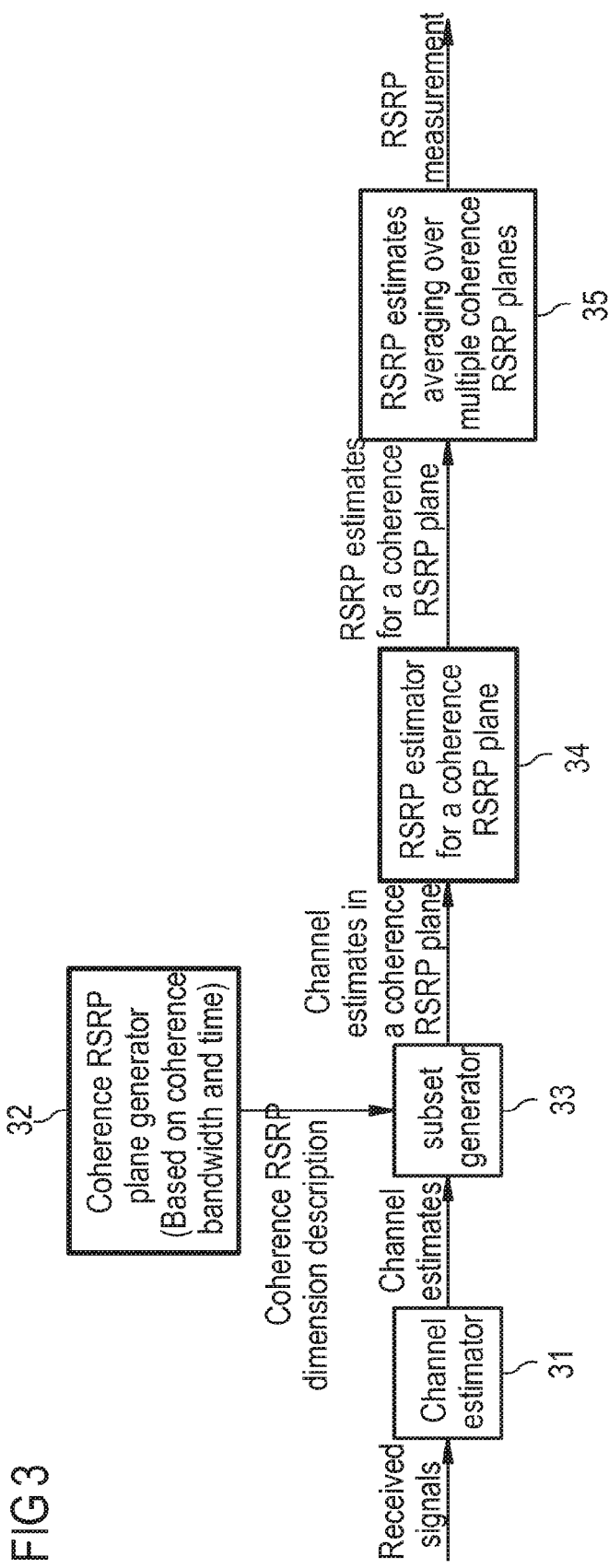
FIG. 3 shows a block diagram of an enhanced RSRP estimator.

FIG. 3 shows relevant parts of the synchronization and cell detection module 17 of FIG. 1 to perform the method.

The channel estimator stage 31 estimates a plurality of channel coefficients of a channel from the received reference signal at time frequency resources of the reference signal. The coherence plane generator 32 creates a coherence plane for each time frequency resource of the reference signal based on coherence bandwidth and coherence time information, e.g., from a Doppler and delay spread estimator (not shown).

FIG. 4 (a) shows a time-frequency grid 41 and a RSRP coherence plane 43 for the center time-frequency resource 42 of the reference signal for that RSRP coherence plane 43. The coherence plane 43 is generated for the center time-frequency resource 42. Hence, a coherence plane can be defined for each of the plurality of channel coefficients as the channel coefficients are at time-frequency resources of the reference signal. The size of the coherence plane 42 can vary as it slides along the time-frequency grid 41. FIG. 4 (b) shows the coherence plane 45 for another center time frequency resource 44.

FIG. 5 shows another way is to divide the time-frequency resources 53 of the reference signal in the time-frequency grid 51 in terms of measurement bandwidth and sub-frames into multiple non-overlapped coherence RSRP planes 52.

Returning to FIG. 3, the subset generator 33 choses a subset of correlated channel coefficients falling into the coherence plane generated by the coherence RSRP plane generator 32.

The RSRP estimator 34 calculates an RSRP estimate for a coherence RSRP plane from averaging cross correlation values between channel coefficients in the coherence plane, i.e., off-diagonal elements of the sample covariance matrix of channel estimate vector for the coherence plane in Eq. (7) and (8).

Let P define the number of coherence RSRP planes (and thus subsets of correlated channel coefficients) at considered time-frequency resources of the reference signal.

$$C_{\hat{h}} = \hat{h}\hat{h}^H \quad (7)$$

$$\text{RSRP}_p = \text{mean}(\text{nonDiagonal}(C_{\hat{h}})), \text{where } p=0,1,\ldots,P-1 \quad (8)$$

Hence, estimating the RSRP of a subset of correlated channel coefficients may comprise computing a correlation matrix of the subset of correlated channel coefficients according to Eq. 7 and averaging over non-diagonal elements of the correlation matrix according to Eq. 8.

The averaging module 35 then averages the RSRP estimates of the plurality of coherence RSRP planes (subsets) by averaging over all subsets of correlated channel coefficients to obtain a mean RSRP and by computing the absolute value of the mean RSRP according to Eq. 9.

The correlation matrix of the subset of correlated channel coefficients may be computed by computing a correlation value for every n-th channel coefficient along time and frequency, wherein n is a positive integer.

A cross-correlation value may be computed for the channel coefficient in the center of a coherence plane or for all the channel coefficients in the coherence plane. This depends on the performance complexity tradeoff.

Apart from defining a coherence plane by channel coherence time and channel coherence bandwidth, a coherence plane may also be defined such that it comprises a number of correlated time-frequency resources of the reference signal that an RSRP estimation error tolerance criteria is fulfilled.

A coherence plane may be defined such that a complement of an average coherence factor of the coherence plane $\rho_{mean}$ does not exceed a pre-defined reference signal received power error estimation error tolerance x as given by $$1 - \rho_{mean} \leq x \text{ or}$$

$$10*\log(1 - \rho_{mean}) \leq x \text{ when } x \text{ is given in dB.}$$

A coherence plane may also be defined such that a complement of a minimum coherence factor of the coherence plane $\rho_{min}$ does not exceed a pre-defined reference signal received power error estimation error tolerance x as given by $$1 - \rho_{min} \leq x \text{ or}$$

$$10*\log(1 - \rho_{min}) \leq x \text{ when } x \text{ is given in dB.}$$

The RSRP estimation based on a coherence plane is superior over current solutions. The RSRP coherence plane is more adaptive to real channel variations and the resulting RSRP estimate is naturally more accurate.

Figure 6:
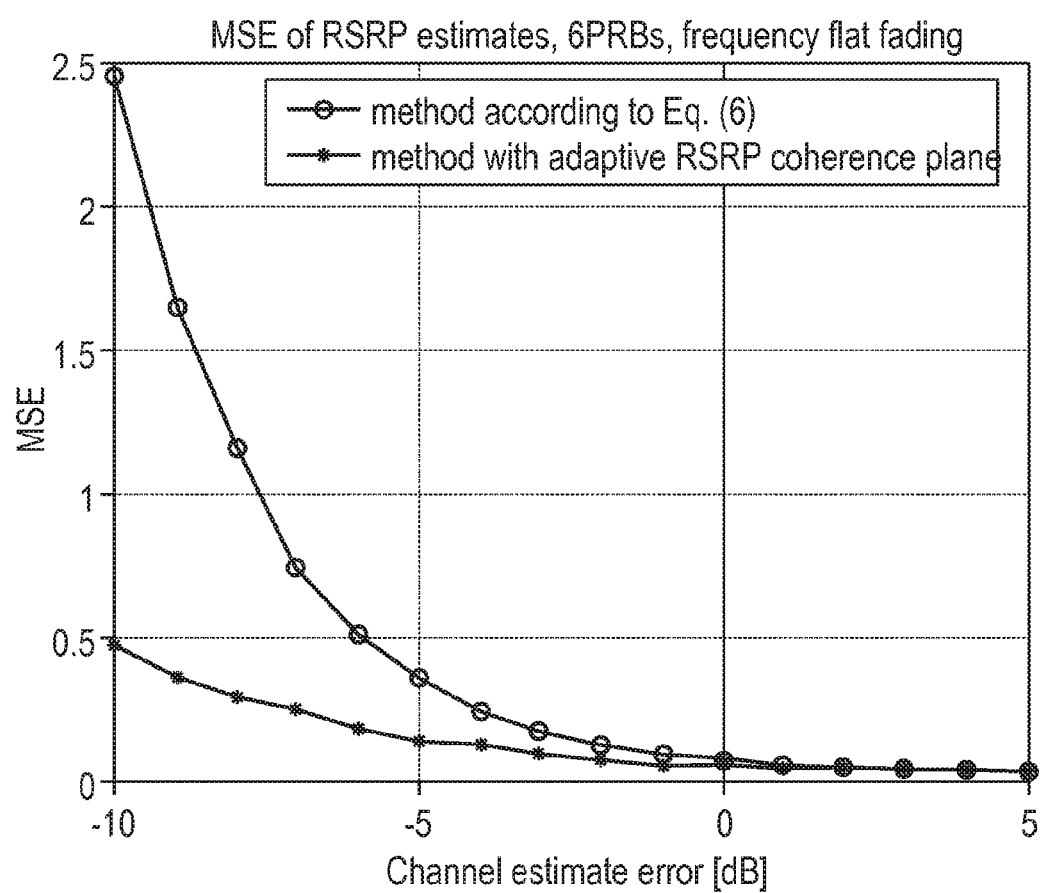
FIG. 6 shows a diagram of the MSE vs. channel estimate errors for (1) method based on a coherence plane and (2) method based on assuming two correlated adjacent channel coefficients and cross correlating the two correlated adjacent channel coefficients according to Eq. (6).

FIG. 6 illustrates the MSE comparison between the RSRP estimation based on a coherence plane and the method in Eq. (6) based on assuming two correlated channel coefficients. It can be observed that a further improvement in terms of accuracy can be achieved applying the based on the coherence plane, especially when the channel estimate has larger errors.

The proposed method can be used for any receive signal power estimation based on pre-known transmitted signals. For example, the proposed method can be used for primary synchronization signal (PSS) and secondary synchronization signal (SSS) received power estimation for an LTE system. The proposed PSS/SSS signal power estimation may be employed for cell validation.

The present disclosure further relates to a computer readable medium having computer-executable instructions for performing the method as described above.

The invention claimed is:

1. A method for a mobile device configured to determine a reference signal received power, the method comprising:
   estimating a plurality of channel coefficients of a channel at time-frequency resources of the reference signal;
   choosing a subset of correlated channel coefficients from the plurality of channel coefficients; and
   estimating the reference signal received power of the subset of correlated channel coefficients based on a cross-correlation between channel coefficients of the subset of correlated channel coefficients,
   wherein choosing the subset of correlated channel coefficients comprises defining a coherence plane based on a coherence time of the channel and a coherence bandwidth of the channel and choosing channel coefficients falling into the coherence plane, and
   wherein the reference signal received power is reportable to a mobile network to facilitate mobility management of the mobile device within the mobile network.

2. The method according to claim 1, the method further comprising:
   estimating an absolute mean reference signal received power by averaging over all subsets of correlated channel coefficients to obtain a mean reference signal received power and
   computing the absolute value of the mean reference signal received power.

3. The method according to claim 1, wherein choosing the subset of correlated channel coefficients comprises:
   choosing channel coefficients along time falling into a coherence time of the channel or
   choosing channel coefficients along frequency falling into a coherence bandwidth of the channel.

4. A method for a mobile device configured to determine a reference signal received power, the method comprising:
   estimating a plurality of channel coefficients of a channel at time-frequency resources of the reference signal;
   choosing a subset of correlated channel coefficients from the plurality of channel coefficients; and
   estimating the reference signal received power of the subset of correlated channel coefficients based on a cross-correlation between channel coefficients of the subset of correlated channel coefficients,
   wherein choosing the subset of correlated channel coefficients comprises choosing two adjacent channel coefficients along frequency or time and estimating the reference signal received power of the subset comprises multiplying a Hermitian of a first channel coefficient of the two channel coefficients by a second channel coefficient of the two adjacent channel coefficients, and
   wherein the reference signal received power is reportable to a mobile network to facilitate mobility management of the mobile device within the mobile network.

5. The method according to claim 4, wherein choosing the subset of correlated channel coefficients comprises dividing the plurality of channel coefficients into a plurality of non-overlapped coherence planes.

6. The method according to claim 4, wherein choosing the subset of correlated channel coefficients comprises defining a coherence plane for each of the plurality channel coefficients.

7. The method according to claim 3, the method comprising:
   estimating the coherence time from Doppler spread.

8. The method according to claim 3, the method comprising:
estimating the coherence bandwidth from delay spread.

9. The method according to claim 1, wherein estimating the reference signal received power of the subset of correlated channel coefficients comprises:
computing a correlation matrix of the subset of correlated channel coefficients; and
averaging over non-diagonal elements of the correlation matrix.

10. The method according to claim 1, wherein estimating the reference signal received power of the subset of correlated channel coefficients comprises:
computing a correlation matrix of the subset of correlated channel coefficients by computing a correlation value for every n-th channel coefficient along time and frequency, wherein n is a positive integer; and
averaging over non-diagonal elements of the correlation matrix.

11. The method according to claim 1, wherein estimating the reference signal received power of the subset of correlated channel coefficients comprises:
computing a correlation matrix of the subset of correlated channel coefficients by computing a correlation value for all channel coefficients within the subset of correlated channel coefficients; and
averaging over non-diagonal elements of the correlation matrix.

12. The method according to claim 1, wherein estimating the reference signal received power of the subset of correlated channel coefficients comprises:
computing a correlation matrix of the subset of correlated channel coefficients by computing a correlation for the center channel coefficient of the subset of correlated channel coefficients; and
averaging over non-diagonal elements of the correlation matrix.

13. A method for a mobile device configured to determine a reference signal received power, the method comprising:
estimating a plurality of channel coefficients of a channel at time-frequency resources of the reference signal;
choosing a subset of correlated channel coefficients from the plurality of channel coefficients; and
estimating the reference signal received power of the subset of correlated channel coefficients based on a cross-correlation between channel coefficients of the subset of correlated channel coefficients,
wherein choosing the subset of correlated channel coefficients comprises any of:
defining a coherence plane such that a complement of an average coherence factor of the coherence plane $\rho_{mean}$ does not exceed a pre-defined reference signal received power error estimation error tolerance x as given by $1-\rho_{mean} \leq x$; and choosing channel coefficients falling into the coherence plane,
defining a coherence plane such that a complement of an average coherence factor of the coherence plane $\rho_{mean}$ does not exceed a pre-defined reference signal received power error estimation error tolerance x in dB as given by $10*\log(1-\rho_{mean}) \leq x$; and choosing channel coefficients falling into the coherence plane,
defining a coherence plane such that a complement of a minimum coherence factor of the coherence plane $\rho_{min}$ does not exceed a pre-defined reference signal received power error estimation error tolerance x as given by $1-\rho_{min} \leq x$; and choosing channel coefficients falling into the coherence plane, and
defining a coherence plane such that a complement of a minimum coherence factor of the coherence plane $\rho_{min}$ does not exceed a pre-defined reference signal received power error estimation error tolerance x in dB as given by $10*\log(1-\rho_{min}) \leq x$; and choosing channel coefficients falling into the coherence plane, and
wherein the reference signal received power is reportable to a mobile network to facilitate mobility management of the mobile device within the mobile network.

14. A computer readable medium having computer-executable instructions for performing the method according to claim 1.

* * * * *